(12) United States Patent
Westerhoff et al.

(10) Patent No.: US 9,531,789 B2
(45) Date of Patent: *Dec. 27, 2016

(54) FAST FILE SERVER METHODS AND SYSTEMS

(71) Applicant: PME IP PTY LTD, Richmond (AU)

(72) Inventors: Malte Westerhoff, Berlin (DE); Detlev Stalling, Berlin (DE)

(73) Assignee: PME IP PTY LTD, Richmond (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,708

(22) Filed: Oct. 8, 2015

(65) Prior Publication Data

US 2016/0028792 A1    Jan. 28, 2016

Related U.S. Application Data

(63) Continuation of application No. 14/279,755, filed on May 16, 2014, now Pat. No. 9,167,027, which is a (Continued)

(51) Int. Cl.
*H04L 29/08* (2006.01)
*G06F 21/62* (2013.01)
(Continued)

(52) U.S. Cl.
CPC .......... *H04L 67/06* (2013.01); *G06F 17/30091* (2013.01); *G06F 17/30203* (2013.01);
(Continued)

(58) Field of Classification Search
CPC ............... G06F 17/30091; G06F 17/30203; G06F 21/6209; H04L 63/20; H04L 67/06; H04L 67/1097; H04L 67/34; H04L 67/42; H04L 69/14
(Continued)

(56) References Cited

U.S. PATENT DOCUMENTS 2,658,310 A    11/1953    Cook
3,431,200 A    3/1969    Davis et al.
(Continued)

FOREIGN PATENT DOCUMENTS

DE    10317384    4/2004
EP    0492897    7/1992
(Continued)

OTHER PUBLICATIONS

ATI Website Index, http://www.ati.com/developer/index.html, Dec. 20, 2002, 2 pages.
(Continued)

*Primary Examiner* — Alina N Boutah
(74) *Attorney, Agent, or Firm* — Sci-Law Strategies, PC

(57) ABSTRACT

The invention provides, in one aspect, an improved system for data access comprising a file server that is coupled to a client device or application executing thereon via one or more networks. The server comprises static storage that is organized in one or more directories, each containing, zero, one or more files. The server also comprises a file system operable, in cooperation with a file system on the client device, to provide authorized applications executing on the client device access to those directories and/or files. Fast file server (FFS) software or other functionality executing on or in connection with the server responds to requests received from the client by transferring requested data to the client device over multiple network pathways. That data can comprise, for example, directory trees, files (or portions thereof), and so forth.

20 Claims, 3 Drawing Sheets

Related U.S. Application Data continuation of application No. 13/755,366, filed on Jan. 31, 2013, now Pat. No. 8,775,510, which is a continuation of application No. 11/845,511, filed on Aug. 27, 2007, now Pat. No. 8,392,529.

(51) Int. Cl.
*G06F 17/30* (2006.01)
*H04L 29/06* (2006.01)

(52) U.S. Cl.
CPC .......... *G06F 21/6209* (2013.01); *H04L 63/20* (2013.01); *H04L 67/1097* (2013.01); *H04L 67/34* (2013.01); *H04L 67/42* (2013.01); *H04L 69/14* (2013.01)

(58) Field of Classification Search
USPC 709/203, 219, 217, 249, 250, 218; 711/168, 711/E12.063; 712/9; 707/704, 764; 710/10, 20, 21, 7; 717/149
See application file for complete search history.

(56) References Cited

U.S. PATENT DOCUMENTS

| | | |
|---|---|---|
| 3,645,040 A | 2/1972 | Ort |
| 4,137,868 A | 2/1979 | Pryor |
| 4,235,043 A | 11/1980 | Harasawa et al. |
| 4,258,661 A | 3/1981 | Margen |
| 4,267,038 A | 5/1981 | Thompson |
| 4,320,594 A | 3/1982 | Raymond |
| 4,746,795 A | 5/1988 | Stewart et al. |
| 4,905,148 A | 2/1990 | Crawford |
| 4,910,912 A | 3/1990 | Lowrey, III |
| 4,928,250 A | 5/1990 | Greenberg et al. |
| 4,958,460 A | 9/1990 | Nielson et al. |
| 4,984,160 A | 1/1991 | Saint Felix et al. |
| 5,031,117 A | 7/1991 | Minor et al. |
| 5,091,960 A | 2/1992 | Butler |
| 5,121,708 A | 6/1992 | Nuttle |
| 5,128,864 A | 7/1992 | Waggener et al. |
| 5,218,534 A | 6/1993 | Trousset et al. |
| 5,235,510 A | 8/1993 | Yamada |
| 5,241,471 A | 8/1993 | Trousset et al. |
| 5,253,171 A | 10/1993 | Hsiao et al. |
| 5,274,759 A | 12/1993 | Yoshioka |
| 5,280,428 A | 1/1994 | Wu et al. |
| 5,287,274 A | 2/1994 | Saint Felix et al. |
| 5,293,313 A | 3/1994 | Cecil |
| 5,307,264 A | 4/1994 | Waggener et al. |
| 5,355,453 A | 10/1994 | Row et al. |
| 5,368,033 A | 11/1994 | Moshfeghi |
| 5,375,156 A | 12/1994 | Kuo-Petravic et al. |
| 5,412,703 A | 5/1995 | Goodenough et al. |
| 5,412,764 A | 5/1995 | Tanaka |
| 5,442,672 A | 8/1995 | Bjorkholm et al. |
| 5,452,416 A | 9/1995 | Hilton |
| 5,488,700 A | 1/1996 | Glassner |
| 5,560,360 A | 10/1996 | Filler |
| 5,594,842 A | 1/1997 | Kaufman et al. |
| 5,602,892 A | 2/1997 | Llacer |
| 5,633,951 A | 5/1997 | Moshfeghi |
| 5,633,999 A | 5/1997 | Clowes et al. |
| 5,640,436 A | 6/1997 | Kawai et al. |
| 5,671,265 A | 9/1997 | Andress |
| 5,744,802 A | 4/1998 | Muehllehner et al. |
| 5,774,519 A | 6/1998 | Lindstrom et al. |
| 5,790,787 A | 8/1998 | Scott et al. |
| 5,793,374 A | 8/1998 | Guenter et al. |
| 5,793,879 A | 8/1998 | Benn et al. |
| 5,813,988 A | 9/1998 | Alfano et al. |
| 5,819,042 A * | 10/1998 | Hansen .................. H04L 41/22 709/222 |
| 5,821,541 A | 10/1998 | Tumer |
| 5,825,842 A | 10/1998 | Taguchi |
| 5,838,756 A | 11/1998 | Taguchi et al. |
| 5,841,140 A | 11/1998 | Mc Croskey et al. |
| 5,909,476 A | 6/1999 | Cheng et al. |
| 5,930,384 A | 7/1999 | Guillemaud et al. |
| 5,931,789 A | 8/1999 | Alfano et al. |
| 5,950,203 A | 9/1999 | Stakuis |
| 5,960,056 A | 9/1999 | Lai |
| 5,963,612 A | 10/1999 | Navab |
| 5,963,613 A | 10/1999 | Navab |
| 5,963,658 A | 10/1999 | Klibanov et al. |
| 6,002,739 A | 12/1999 | Heumann |
| 6,018,562 A | 1/2000 | Willson |
| 6,032,264 A | 2/2000 | Beffa et al. |
| 6,044,132 A | 3/2000 | Navab |
| 6,049,390 A | 4/2000 | Notredame |
| 6,049,582 A | 4/2000 | Navab |
| 6,072,177 A | 6/2000 | Mccroskey et al. |
| 6,088,423 A | 7/2000 | Krug et al. |
| 6,091,422 A | 7/2000 | Ouaknine et al. |
| 6,104,827 A | 8/2000 | Benn et al. |
| 6,105,029 A | 8/2000 | Maddalozzo, Jr. et al. |
| 6,108,007 A | 8/2000 | Shochet |
| 6,108,576 A | 8/2000 | Alfano et al. |
| 6,123,733 A | 9/2000 | Dalton |
| 6,175,655 B1 | 1/2001 | George |
| 6,219,061 B1 | 4/2001 | Lauer et al. |
| 6,226,005 B1 | 5/2001 | Laferriere |
| 6,236,704 B1 | 5/2001 | Navab et al. |
| 6,243,098 B1 | 6/2001 | Lauer et al. |
| 6,249,594 B1 | 6/2001 | Hibbard |
| 6,255,655 B1 | 7/2001 | Mc Croskey et al. |
| 6,264,610 B1 | 7/2001 | Zhu |
| 6,268,846 B1 | 7/2001 | Georgiev |
| 6,278,460 B1 | 8/2001 | Myers et al. |
| 6,282,256 B1 | 8/2001 | Grass et al. |
| 6,289,235 B1 | 9/2001 | Webber et al. |
| 6,304,771 B1 | 10/2001 | Yodh et al. |
| 6,320,928 B1 | 11/2001 | Vaillant et al. |
| 6,324,241 B1 | 11/2001 | Besson |
| 6,377,257 B1 | 4/2002 | Borrel |
| 6,377,266 B1 | 4/2002 | Baldwin |
| 6,384,821 B1 | 5/2002 | Borrel |
| 6,404,843 B1 | 6/2002 | Vaillant |
| 6,415,013 B1 | 7/2002 | Hsieh et al. |
| 6,470,067 B1 | 10/2002 | Harding |
| 6,470,070 B2 | 10/2002 | Menhardt |
| 6,475,150 B2 | 11/2002 | Haddad |
| 6,507,633 B1 | 1/2003 | Elbakri et al. |
| 6,510,241 B1 | 1/2003 | Vaillant et al. |
| 6,519,355 B2 | 2/2003 | Nelson |
| 6,526,305 B1 | 2/2003 | Mori |
| 6,559,958 B2 | 5/2003 | Motamed |
| 6,591,004 B1 | 7/2003 | VanEssen et al. |
| 6,615,063 B1 | 9/2003 | Ntziachristos et al. |
| 6,633,688 B1 | 10/2003 | Nixon |
| 6,636,623 B2 | 10/2003 | Nelson et al. |
| 6,654,012 B1 | 11/2003 | Lauer et al. |
| 6,658,142 B1 | 12/2003 | Kam et al. |
| 6,664,963 B1 | 12/2003 | Zatz |
| 6,674,430 B1 | 1/2004 | Kaufman et al. |
| 6,697,508 B2 | 2/2004 | Nelson |
| 6,707,878 B2 | 3/2004 | Claus et al. |
| 6,718,195 B2 | 4/2004 | Van Der Mark et al. |
| 6,731,283 B1 | 5/2004 | Navab |
| 6,740,232 B1 | 5/2004 | Beaulieu |
| 6,741,730 B2 | 5/2004 | Rahn et al. |
| 6,744,253 B2 | 6/2004 | Stolarczyk |
| 6,744,845 B2 | 6/2004 | Harding et al. |
| 6,745,070 B2 | 6/2004 | Wexler et al. |
| 6,747,654 B1 | 6/2004 | Laksono et al. |
| 6,754,299 B2 | 6/2004 | Patch |
| 6,765,981 B2 | 7/2004 | Heumann |
| 6,768,782 B1 | 7/2004 | Hsieh et al. |
| 6,770,893 B2 | 8/2004 | Nelson |
| 6,771,733 B2 | 8/2004 | Katsevich |
| 6,778,127 B2 | 8/2004 | Stolarczyk et al. |
| 6,785,409 B1 | 8/2004 | Suri |
| 6,798,417 B1 | 9/2004 | Taylor |
| 6,807,581 B1 | 10/2004 | Starr et al. |

(56) References Cited

U.S. PATENT DOCUMENTS

| | | | |
|---|---|---|---|
| 6,825,840 B2 | 11/2004 | Gritz | |
| 6,825,843 B2 | 11/2004 | Allen et al. | |
| 6,915,309 B1* | 7/2005 | Conley | H04L 41/12 |
| 6,923,906 B2 | 8/2005 | Oswald et al. | |
| 6,947,047 B1 | 9/2005 | Moy et al. | |
| 6,978,206 B1 | 12/2005 | Pu | |
| 7,003,547 B1 | 2/2006 | Hubbard | |
| 7,006,101 B1 | 2/2006 | Brown et al. | |
| 7,031,022 B1 | 4/2006 | Komori et al. | |
| 7,034,828 B1 | 4/2006 | Drebin et al. | |
| 7,039,723 B2 | 5/2006 | Hu | |
| 7,050,953 B2 | 5/2006 | Chiang et al. | |
| 7,054,852 B1 | 5/2006 | Cohen | |
| 7,058,644 B2 | 6/2006 | Patchet et al. | |
| 7,076,735 B2 | 7/2006 | Callegari | |
| 7,098,907 B2 | 8/2006 | Houston et al. | |
| 7,120,283 B2 | 10/2006 | Thieret | |
| 7,133,041 B2 | 11/2006 | Kaufman et al. | |
| 7,154,985 B2 | 12/2006 | Dobbs | |
| 7,167,176 B2 | 1/2007 | Sloan et al. | |
| 7,184,041 B2 | 2/2007 | Heng et al. | |
| 7,185,003 B2 | 2/2007 | Bayliss et al. | |
| 7,219,085 B2 | 5/2007 | Buck et al. | |
| 7,242,401 B2 | 7/2007 | Yang et al. | |
| 7,262,770 B2 | 8/2007 | Sloan et al. | |
| 7,274,368 B1 | 9/2007 | Keslin | |
| 7,299,232 B2 | 11/2007 | Stakutis et al. | |
| 7,315,926 B2 | 1/2008 | Fridella et al. | |
| 7,324,116 B2 | 1/2008 | Boyd et al. | |
| 7,339,585 B2 | 3/2008 | Verstraelen et al. | |
| 7,472,156 B2 | 12/2008 | Philbrick et al. | |
| 7,502,869 B2 | 3/2009 | Boucher et al. | |
| 7,506,375 B2 | 3/2009 | Kanda et al. | |
| 7,552,192 B2 | 6/2009 | Carmichael | |
| 7,609,884 B1 | 10/2009 | Stalling | |
| 7,693,318 B1 | 4/2010 | Stalling | |
| 7,701,210 B2 | 4/2010 | Ichinose | |
| 7,774,435 B2* | 8/2010 | Ryan | G06F 9/4411 709/200 |
| 7,778,392 B1 | 8/2010 | Berman | |
| 7,876,944 B2 | 1/2011 | Stalling | |
| 7,899,516 B2 | 3/2011 | Chen et al. | |
| 7,956,612 B2 | 6/2011 | Sorensen | |
| 7,991,837 B1 | 8/2011 | Tahan | |
| 8,107,592 B2 | 1/2012 | Berman | |
| 8,189,002 B1 | 5/2012 | Westerhoff | |
| 8,319,781 B2 | 11/2012 | Westerhoff | |
| 8,369,600 B2 | 2/2013 | Can et al. | |
| 8,386,560 B2 | 2/2013 | Ma | |
| 8,392,529 B2 | 3/2013 | Westerhoff | |
| 8,508,539 B2 | 8/2013 | Vlietinck | |
| 8,548,215 B2 | 10/2013 | Westerhoff | |
| 8,775,510 B2 | 7/2014 | Westerhoff | |
| 8,976,190 B1 | 3/2015 | Westerhoff | |
| 9,019,287 B2 | 4/2015 | Westerhoff | |
| 2001/0026848 A1 | 10/2001 | Van Der Mark | |
| 2002/0016813 A1 | 2/2002 | Woods et al. | |
| 2002/0034817 A1 | 3/2002 | Henry et al. | |
| 2002/0049825 A1 | 4/2002 | Jewett et al. | |
| 2002/0055988 A1* | 5/2002 | Crooks | H04L 12/2854 709/220 |
| 2002/0080143 A1 | 6/2002 | Morgan et al. | |
| 2002/0099290 A1 | 7/2002 | Haddad | |
| 2002/0099844 A1 | 7/2002 | Baumann et al. | |
| 2002/0123680 A1 | 9/2002 | Vailant | |
| 2002/0138019 A1 | 9/2002 | Wexler | |
| 2002/0150202 A1 | 10/2002 | Harding | |
| 2002/0150285 A1 | 10/2002 | Nelson | |
| 2002/0165927 A1* | 11/2002 | Theriault | G06T 1/60 709/213 |
| 2002/0180747 A1 | 12/2002 | Lavelle et al. | |
| 2002/0184238 A1 | 12/2002 | Chylla | |
| 2002/0184349 A1 | 12/2002 | Manukyan | |
| 2003/0001842 A1 | 1/2003 | Munshi | |
| 2003/0031352 A1 | 2/2003 | Nelson et al. | |
| 2003/0059110 A1 | 3/2003 | Wilt | |
| 2003/0065268 A1 | 4/2003 | Chen et al. | |
| 2003/0086599 A1 | 5/2003 | Armato | |
| 2003/0103666 A1 | 6/2003 | Edie et al. | |
| 2003/0120743 A1 | 6/2003 | Coatney et al. | |
| 2003/0123720 A1 | 7/2003 | Launav et al. | |
| 2003/0149812 A1 | 8/2003 | Schoenthal et al. | |
| 2003/0158786 A1 | 8/2003 | Yaron | |
| 2003/0158895 A1* | 8/2003 | Mehra | H04L 29/06 709/203 |
| 2003/0176780 A1 | 9/2003 | Arnold | |
| 2003/0179197 A1 | 9/2003 | Sloan et al. | |
| 2003/0194049 A1 | 10/2003 | Claus et al. | |
| 2003/0220569 A1 | 11/2003 | Dione | |
| 2003/0220772 A1 | 11/2003 | Chiang et al. | |
| 2003/0227456 A1 | 12/2003 | Gritz | |
| 2003/0234791 A1 | 12/2003 | Boyd et al. | |
| 2004/0010397 A1 | 1/2004 | Barbour et al. | |
| 2004/0012596 A1 | 1/2004 | Allen et al. | |
| 2004/0015062 A1 | 1/2004 | Ntziachristos et al. | |
| 2004/0022348 A1 | 2/2004 | Heumann | |
| 2004/0059822 A1 | 3/2004 | Jiang | |
| 2004/0066384 A1 | 4/2004 | Ohba | |
| 2004/0066385 A1 | 4/2004 | Kilgard | |
| 2004/0066891 A1 | 4/2004 | Freytag | |
| 2004/0102688 A1 | 5/2004 | Walker | |
| 2004/0125103 A1 | 7/2004 | Kaufman | |
| 2004/0133652 A1 | 7/2004 | Miloushev et al. | |
| 2004/0147039 A1 | 7/2004 | Van Der Mark | |
| 2004/0162677 A1 | 8/2004 | Bednar | |
| 2004/0170302 A1 | 9/2004 | Museth et al. | |
| 2004/0210584 A1 | 10/2004 | Nir et al. | |
| 2004/0215858 A1 | 10/2004 | Armstrong et al. | |
| 2004/0215868 A1 | 10/2004 | Solomon et al. | |
| 2004/0239672 A1 | 12/2004 | Schmidt | |
| 2004/0240753 A1 | 12/2004 | Hu | |
| 2005/0017972 A1 | 1/2005 | Poole et al. | |
| 2005/0066095 A1 | 3/2005 | Mullick et al. | |
| 2005/0088440 A1 | 4/2005 | Sloan et al. | |
| 2005/0128195 A1 | 6/2005 | Houston et al. | |
| 2005/0152590 A1 | 7/2005 | Thieret | |
| 2005/0225554 A1 | 10/2005 | Bastos et al. | |
| 2005/0231503 A1 | 10/2005 | Heng et al. | |
| 2005/0239182 A1 | 10/2005 | Berzin | |
| 2005/0240628 A1 | 10/2005 | Jiang et al. | |
| 2005/0259103 A1 | 11/2005 | Kilgard et al. | |
| 2005/0270298 A1 | 12/2005 | Thieret | |
| 2005/0271302 A1 | 12/2005 | Khamene et al. | |
| 2006/0010438 A1 | 1/2006 | Brady et al. | |
| 2006/0028479 A1 | 2/2006 | Chun | |
| 2006/0034511 A1 | 2/2006 | Verstraelen | |
| 2006/0197780 A1 | 9/2006 | Watkins et al. | |
| 2006/0214949 A1 | 9/2006 | Zhang | |
| 2006/0239540 A1 | 10/2006 | Serra | |
| 2006/0282253 A1 | 12/2006 | Buswell et al. | |
| 2007/0038939 A1 | 2/2007 | Challen | |
| 2007/0046966 A1 | 3/2007 | Mussack | |
| 2007/0047468 A1* | 3/2007 | Sumiyoshi | H04L 41/0803 370/254 |
| 2007/0067497 A1 | 3/2007 | Craft et al. | |
| 2007/0092864 A1 | 4/2007 | Reinhardt | |
| 2007/0097133 A1 | 5/2007 | Stauffer et al. | |
| 2007/0116332 A1 | 5/2007 | Cai et al. | |
| 2007/0127802 A1 | 6/2007 | Odry | |
| 2007/0156955 A1 | 7/2007 | Royer, Jr. | |
| 2007/0165917 A1 | 7/2007 | Cao et al. | |
| 2007/0185879 A1 | 8/2007 | Roublev et al. | |
| 2007/0188488 A1 | 8/2007 | Choi | |
| 2007/0263598 A1* | 11/2007 | Chen | H04L 29/06027 370/352 |
| 2008/0009055 A1 | 1/2008 | Lewnard | |
| 2008/0031238 A1* | 2/2008 | Harmelin | H04L 41/0843 370/389 |
| 2008/0034040 A1* | 2/2008 | Wherry | G06Q 10/107 709/204 |
| 2008/0042923 A1 | 2/2008 | De Laet | |
| 2008/0086557 A1 | 4/2008 | Roach | |
| 2008/0115139 A1 | 5/2008 | Inglett et al. | |
| 2008/0137929 A1 | 6/2008 | Chen et al. | |

(56) References Cited

U.S. PATENT DOCUMENTS

| | | |
|---|---|---|
| 2008/0155890 A1 | 7/2008 | Oyler |
| 2008/0174593 A1 | 7/2008 | Ham |
| 2008/0208961 A1 | 8/2008 | Kim et al. |
| 2008/0224700 A1 | 9/2008 | Sorensen |
| 2008/0248794 A1* | 10/2008 | Mirza-Baig ......... H04L 41/0809 455/423 |
| 2008/0265029 A1* | 10/2008 | Graves ................. G06Q 10/087 235/435 |
| 2008/0281908 A1 | 11/2008 | McCanne et al. |
| 2009/0005693 A1 | 1/2009 | Brauner et al. |
| 2009/0043988 A1 | 2/2009 | Archer et al. |
| 2009/0077097 A1 | 3/2009 | Lacapra et al. |
| 2009/0147793 A1 | 6/2009 | Hayakawa et al. |
| 2009/0208082 A1 | 8/2009 | Westerhoff et al. |
| 2009/0210487 A1 | 8/2009 | Westerhoff et al. |
| 2009/0225076 A1 | 9/2009 | Vlietinck |
| 2009/0245610 A1 | 10/2009 | Can et al. |
| 2010/0060652 A1 | 3/2010 | Karlsson |
| 2010/0106860 A1* | 4/2010 | Li ....................... H04L 12/2834 709/250 |
| 2010/0123733 A1 | 5/2010 | Zaharia |
| 2010/0174823 A1 | 7/2010 | Huang |
| 2010/0272342 A1 | 10/2010 | Berman et al. |
| 2010/0278405 A1 | 11/2010 | Kakadiaris et al. |
| 2011/0044524 A1 | 2/2011 | Wang et al. |
| 2012/0078088 A1 | 3/2012 | Whitestone et al. |

FOREIGN PATENT DOCUMENTS

| | | |
|---|---|---|
| EP | 0502187 | 9/1992 |
| EP | 0611181 | 8/1994 |
| EP | 0476070 | 8/1996 |
| EP | 0925556 | 6/1999 |
| EP | 0953943 | 11/1999 |
| EP | 0964 366 | 12/1999 |
| EP | 187340 | 3/2001 |
| EP | 2098895 | 9/2009 |
| EP | 2098994 | 9/2009 |
| WO | WO9016072 | 12/1990 |
| WO | WO9102320 | 2/1991 |
| WO | WO9205507 | 4/1992 |
| WO | WO9642022 | 12/1996 |
| WO | WO9810378 | 3/1998 |
| WO | WO9812667 | 3/1998 |
| WO | WO9833057 | 7/1998 |
| WO | WO0120546 | 3/2001 |
| WO | WO0134027 | 5/2001 |
| WO | WO2011065929 | 6/2001 |
| WO | WO0163561 | 8/2001 |
| WO | WO0174238 | 10/2001 |
| WO | WO0185022 | 11/2001 |
| WO | WO0241760 | 5/2002 |
| WO | WO02067201 | 8/2002 |
| WO | WO02082065 | 10/2002 |
| WO | WO03061454 | 7/2003 |
| WO | WO03088133 | 10/2003 |
| WO | WO03090171 | 10/2003 |
| WO | WO03098539 | 11/2003 |
| WO | WO2004019782 | 3/2004 |
| WO | WO2004020996 | 3/2004 |
| WO | WO2004020997 | 3/2004 |
| WO | WO2004034087 | 4/2004 |
| WO | WO2004044848 | 5/2004 |
| WO | WO2004066215 | 8/2004 |
| WO | WO2004072906 | 8/2004 |
| WO | WO2005071601 | 8/2005 |
| WO | WO2009029636 | 3/2009 |
| WO | WO2009067675 | 5/2009 |
| WO | WO2009067680 | 5/2009 |

OTHER PUBLICATIONS

Cabral et al., Accelerated Volume Rendering and Tomographic Reconstruction Using Texture Mapping Hardware•, Silicon Graphics Computer Systems, 1995 IEEE, DD. 91-97.

Carr, Nathan A., Jesse D. Hall, John C. Hart, The ray engine, Proceedings of the ACM SIGGRAPH/Eurographics conference on Graphics hardware, Sep. 1-2, 2002, pp. 37-46.

Chidlow, et al, Rapid Emission Tomography Reconstruction, Proceedings of the 2003 Eurographics/IEEE TVCG Workshop on Volume Graphics, Tokyo, Japan, Jul. 7-8, 2003, 13 pages.

Cohen, Michael, et al., A Progressive Refinement Approach to Fast Radiosity Image Generation, Computer Graphics, vol. 22, No. 4, Aug. 1988, pp. 75-84.

Corner, B., University of Nebraska-Lincoln, MatLab.txt, 2003, 1 page.

Dachille, et al., High-Quality Volume Rendering Using Texture Mapping Hardware, Siggraph/Eurographics Hardware Workshop (1998) (8 pages).

Dempster, et al., Maximum Likelihood From Incomplete Data Via the EM Algorithm, Harvard University and Educational Testing Service, Dec. 8, 1976, pp. 1-38.

Dennis, C, et al.,, Overview of X-Ray Computed Tomography, http://www.howstuffworks.com/framed.htm?parent=c . . . tm&url=http://www.ctlab.geo.utexas.edu/overview/, Dec. 26, 2002, 5 pages.

Dobbins, et al., Digital X-Ray Tomosynthesis: Current State of the Art and Clinical Potential, Physics in Medicine and Biology, vol. 48, pp. R65-R106 (2003).

Doggett, Michael, ATI, Programmability Features of Graphics Hardware, (paper) Apr. 23, 2002, pp. C1-C22.

Doggett, Michael, ATI, Programmability Features of Graphics Hardware, (slideshow) slides 1-62 31 pages.

Du, H., Sanchez-Elez, M., Tabrizi, N., Bagherzadeh, N., Anido, M. L., and Fernandez, M. 2003. Interactive ray tracing on reconfigurable SIMD MorphoSys. In Proceedings of the 2003 Conference on Asia South Pacific Design Automation (Kitakyushu, Japan, Jan. 21-24, 2003). ASPDAC. ACM, New York, NY, 471-476.

Eldridge Matthew, Homan Igehy, Pat Hanrahan, Pomegranate: a fully scalable graphics architecture, Proceedings of the 27th annual conference on Computer graphics and interactive techniques, p. 443-454, Jul. 2000.

Fang, L., et al., Fast Maximum Intensity Projection Algorithm Using Shear Warp Factorization and Reduced Resampling, Mangetic Resonance in Medicine 47:696-700 (2002).

Filtered Backprojection Reconstruction, http://www.physics.ubd.ca/-mirg/home/tutorial/fbDrecon.html, 216/2003, 5 pages.

Goddard et al., High-speed cone-beam reconstruction: an embedded systems approach, 2002, SPIE vol. 4681, pp. 483-491.

Grass et al., Three-dimensional reconstruction of high contrast objects using C-arm image intensifier projection data, 1999, Computerized Medical Imaging and Graphics, 23, pp. 311-321.

Hadwiger, Markus, et al., Hardware-Accelerated High-Quality Reconstruction of Volumetric Data on PC Graphics Hardware, VRVis Research Center, Vienna, Austria, and Institute of Computer Graphics and Algorithms, Vienna University of Technology, Austria, 9 pages.

Hastreiter et al. (Integrated registration and visualization of medical image data, Proc. Computer Graphics International, Jun. 22-26, 1998, pp. 78-85).

Hopf, M., Ertl, T., Accelerating 3d Convolution Using Graphics Hardware, Proc. IEEE Visualization, 1999, 5 pages.

Hudson, et al., Accelerated Image Reconstruction Using Ordered Subsets of Projection Data, IEEE Transactions on Medical Imaging, vol. 13, No. 4, Dec. 1994, pp. 601-609.

Image Registration Slideshow, 105 pages.

Iterative definition, Merriam-Webster on-line dictionary, printed Aug. 26, 2010, 3 pages.

Jain, Anju, A Programmable Graphics Chip, pcquest.com, Jun. 18, 2001.

Jones et al., Positron Emission Tomographic Images and Expectation Maximization: A VLSI Architecture for Multiple Iterations Per Second, Computer Technology and Imaging, Inc., 1988 IEEE, pp. 620-624.

Kajiya, J. T., Ray tracing volume densities, Proc. Siggraph, Jul. 1984, Computer Graphics, vol. 18, No. 3, pp. 165-174.

Karlsson, Filip; Ljungstedt, Carl Johan; Ray tracing fully implemented on programmable graphics hardware, Master's Thesis,

(56) References Cited

OTHER PUBLICATIONS

Chalmers University of Technology, Dept. of Computer Engineering, Goteborg, Sweden, copyright © 2004, 29 pages.
Kruger J. and R. Westermann, Acceleration Techniques for GPU-based Volume Rendering, Proceedings of IEEE Visualization, 2003, 6 pages.
Lange et al., EM Reconstruction Algorithms for Emission and Transmission Tomography, J Computer Assisted Tomography 8, DD. 306, et seq. (1984).
Lange et al., Globally Convergent Algorithms for Maximum a Posteriori Transmission Tomography, IEEE Transactions on Image Processing, Vo. 4, No. 10, Oct. 1995, pp. 1430-1438.
Li et al., Tomographic Optical Breast Imaging Guided by Three-Dimensional Mammography, Applied Optics, Sep. 1, 2003, vol. 42, No. 25, pp. 5181-5190.
Li, et al., A Brick Caching Scheme for 30 Medical Imaging, Apr. 15-18, 2004, IEEE International Symposium on Biomedical Imaging: Macro to Nano 2004, vol. 1, pp. 563-566.
Maes, et al. Multimodality Image Registration by Maximization of Mutual Information, IEEE Tran. on Medical Imaging, vol. 16, No. 2, Apr. 1997. pp. 187-198).
Max, N., Optical Models for Direct Volume Rendering, IEEE Transactions on Visualization and Computer Graphics, Jun. 1995, 1(2): pp. 99-108.
McCool, M. et al., Shader Algebra, 2004, pp. 787-795.
McCool, Michael J., Smash: A Next-Generation API for Programmable Graphics Accelerators, Technical Report CS-200-14, Computer Graphics Lab Dept. of Computer Science, University of Waterloo, Aug. 1, 2000.
Microsoft, Architectural Overview Direct for 3D, http://msdn.microsoft.com/library/default.asp?url=/library/en-us/dx8_c/directx_cpp/Graphics/ProgrammersGuide/GettingStarted/ Architecture, 12120/2002, 22 pages.
Mitchell, Jason L., RadeonTM 9700 Shading, SIGGRAPH 2002—State of the Art in Hardware Shading Course Notes, DD.3.1-1-3.1-39, 39 pages.
Mitschke et al., Recovering the X-ray projection geometry for three-dimensional tomographic reconstruction with additional sensors: Attached camera versus external navigation system, 2003, Medical Image Analysis, vol. 7, pp. 65-78.
Mueller, K., and R. Yagel, Rapid 3-D Cone Beam Reconstruction With the Simultaneous Algebraic Reconstruction Technique (Sart) Using 2-D Texture Mapping Hardware, IEEE Transactions on Medical Imaging, Dec. 2000, 19(12): pp. 1227-1237.
Navab, N., et al., 3D Reconstruction from Projection Matrices in a C-Arm Based 3D-Angiography System, W.M. Wells e al., eds., MICCAI'98, LNCS 1496, pp. 119-129, 1998.
Parker, S., et al., Interactive Ray Tracing for Isosurface rendering, IEEE, 1998, pp. 233-258.
PCT/US2008/084282, Preliminary and International Search Reports, dated May 11, 2011.
PCT/US2005/000837, Preliminary and International Search Reports, dated May 11, 2005.
PCT/US2008/74397, Preliminary and International Search Reports, dated Dec. 3, 2008.
PCT/US2008/84368, Preliminary and International Search Reports, dated Jan. 13, 2009.
PCT/US2008/84376, Preliminary and International Search Reports, dated Jan. 12, 2009.
Pfister, H., et. al., The VolumePro real-time ray-casting System, Computer Graphics Proceedings of SIGGRAPH), Aug. 1999, No. 251-260.
Phong, B. T. Illumination for Computer Generated Pictures, Communications of the ACM, 18(6), Jun. 1975, pp. 311-317.
Porter, D. H. 2002. Volume Visualization of High Resolution Data using PC-Clusters. Tech. rep., University of Minnesota. Available at http://www.lcse.umn.edu/hvr/pc_vol_rend_L.pdf.
Potmesil, M. and Hoffert, E. M. 1989. The pixel machine: a parallel image computer. In Proceedings of the 16th Annual Conference on Computer Graphics and interactive Techniques SIGGRAPH '89. ACM, New York, NY, 69-78.
Purcell, T., et al., Real-time Ray Tracing on Programmable Graphics Hardware, Department of Computer Science, Stanford University, Stanford, CA, Submitted for review to SIGGRAPH 2002, 2002. http://graphics.stanford.edu/papers/rtongfx/rtongfx_submit.pdf.
Purcell, T., et. al., Ray tracings on Programmable Graphics Hardware, Computer Graphics (ProceedinQs of SIGGRAPH), 1998, pp. 703-712.
Purcell, Timothy J., Craig Donner, Mike Cammarano, Henrik Wann Jensen, Pat Hanrahan, Photon mapping on programmable graphics hardware, Proceedings of the ACM SIGGRAPH/Eurographics conference on Graphics hardware, Jul. 26-27, 2003, 11 pages.
Ramirez et al. (Prototypes stability analysis in the design of a binning strategy for mutual information based medical image registration, IEEE Annual Meeting of the Fuzzy Information, Jun. 27-30, 2004, vol. 2, pp. 862-866.
Rib Cage Projection, downloaded from http://www.colorado.edu/physics/2000/tomography/final_rib_cage.html on Dec. 26, 2002, 3 pages.
Roettger, Stefan, et al., Smart Hardware-Accelerated Volume Rendering, Joint Eurographics—IEEE TCVG Symposium on Visualization, 2003, pp. 231-238, 301.
Sandborg, Michael, Computed Tomography: Physical principles and biohazards, Department of Radiation Physics, Faculty of Health Sciences, Linkoping University, Sweden, Report 81 ISSN 1102-1799, Sep. 1995 ISRN ULI-RAD-R—81—SE, 18 pages.
Sarrut et al. (Fast 30 Image Transformations for Registration Procedures, Proc. lnt'I Conf. on Image Analysis and Processing, Sep. 27-29, 1999, pp. 446-451.
Selldin, Hakan, Design and Implementation of an Application Programming Interface for Volume Rendering, Linkooings Universitet.
Shekhar, R.; Zagrodsky, V., Cine MPR: interactive multiplanar reformatting of four-dimensional cardiac data using hardware-accelerated texture mapping, IEEE Transactions on Information Technology in Biomedicine, vol. 7, No. 4, pp. 384-393, Dec. 2003.
Silver, et al., Determination and correction of the wobble of a C-arm gantry, Medical Imaging 2000: Image Processing, Kenneth M. Hanson, ed., Proceedings of SPIE vol. 3970 (2000).
Stevens, Grant, et al., Alignment of a Volumetric Tomography System, Med. Phys., 28 (7), Jul. 2001.
Tasdizen, T., Ross Whitaker, Paul Burchard, Stanley Osher, Geometric surface processing via normal maps, ACM Transactions on Graphics (TOG), v.22 n. 4, p. 1012-1033, Oct. 2003.
Tasdizen, T.; Whitaker, R.; Burchard, P.; Osher, S.; Geometric surface smoothing via anisotropic diffusion of normals, IEEE Visualization, VIS 2002, Nov. 2002, pp. 125-132.
Technical Brief: NVIDIA nfiniteFX Engine: Programmable Pixel Shaders, NVIDIA Corporation, 5 pages.
Technical Brief: NVIDIA nfiniteFX Engine: Programmable Vertex Shaders, NVIDIA Corporation, 12 pages.
Viola, I, et al., Hardware Based Nonlinear Filtering and Segmentation Using High Level Shading Languages, Technical Report TR-186-2-03-07, May 2003, 8 pages.
Viola, P., Alignment by Maximization of Mutual Information, PhD Thesis MIT (Also Referred to As-Al Technical report No. 1548), MIT Artificial Intelligence Lab, Jun. 1, 1995, pp. 1-29.
Weiler, M, M. Kraus and T. Ertl, Hardware-Based View-Independent Cell Projection, Proceedings IEEE Symposium on Volume Visualization 2002, pp. 13-22.
Weiler, M. et al., Hardware-based ray casting for tetrahedral meshes, IEEE Visualization, VIS 2003, Oct. 24-24, 2003, pp. 333-340.
Weiler, M. et al., Hardware-Based view-Independent Cell Projection, IEEE, 2002, pp. 13-22.
Weiskopf, D., T. Schafhitzel, T. Ertl, GPU-Based Nonlinear Ray Tracing, Eurographics, vol. 23, No. 3, Aug. 2004.
Wen, Junhai; Zigang Wang; Bin Li; Zhengrong Liang; An investigation on the property and fast implementation of a ray-driven method for inversion of the attenuated Radon transform with

(56) References Cited

OTHER PUBLICATIONS variable focusing fan-beam collimators, 2003 IEEE Nuclear Science Symposium Conference Record, vol. 3, Oct. 19-25, 2003, pp. 2138-2142.

Wu et al., Tomographic Mammography Using a Limited Number of Low-dose Conebeam Projection Images, Med. Phys., pp. 365-380 (2003).

Xu et al., Toward a Unified Framework for Rapid 30 Computed Tomography on Commodity GPUs, Oct. 19-25, 2003, IEEE Nuclear Science Symposium Conference 2003, vol. 4, pp. 2757-2759.

Xu et al., Ultra-fast 30 Filtered Backprojection on Commodity Graphics Hardware, Apr. 1-18, 2004, IEEE International symposium on Biomedical Imaging: Macro to Nano, vol. 1, pp. 571-574 and corresponding power point presentation.

\* cited by examiner

FAST FILE SERVER METHODS AND SYSTEMS

PRIORITY CLAIM

This application is a continuation of U.S. application Ser. No. 14/279,755 filed May 16, 2014 which issued Oct. 20, 2015 as U.S. Pat. No. 9,167,027, which is a continuation of U.S. application Ser. No. 13/755,366 filed Jan. 31, 2013, which issued Jul. 8, 2014 as U.S. Pat. No. 8,775,510 which is a continuation of U.S. application Ser. No. 11/845,511 filed Aug. 27, 2007 which issued Mar. 5, 2013 as U.S. Pat. No. 8,392,529, the teachings of which are explicitly incorporated herein by reference in their entireties.

BACKGROUND OF THE INVENTION

The invention pertains to digital data processing and, more particularly, to methods and apparatus for accessing and/or delivering data in a client-server environment. The invention has application in improving file and data access over local area networks, the Internet, and other networks.

Traditional file servers or network attached storage (NAS) devices support access requests received from networked client devices (e.g., PCs, workstations and the like) using network file system capabilities built in to the server operating system—which may be, for example, Linux or Microsoft Windows Server. Typically, these file systems, e.g. SMB/CIFS, allow the clients to access files and directories maintained on the server as if they were local to the requesting clients themselves—albeit, the transfers take place via the network and, as a result, are traditionally much slower.

Thus, for example, file transfers from a NAS to a client device may be as slow as 10-50 Mbyte/s, even if Gigabit-Ethernet—which has a theoretical peak bandwidth of about 110 Mbyte/s—is used as the network. The discrepancy is more pronounced when actual transfer speeds of 10-50 Mbyte/s are measured against the read performance delivered by fast RAID systems of the type often attached to high-performance file servers. Those RAID systems are capable of delivering at rates of 200-300 MByte/s, or even higher for sufficiently large sequential reads.

Data input/output (I/O) performance is a critical component in data intensive applications such as, by way of non-limiting example, signal processing applications, visualization applications, and the like.

An object of the invention is to provide improved methods and systems for digital data processing and, more particularly, by way of non-limiting example, for accessing and/or delivering data in a client-server environment.

A related object of the invention is to provide such methods and systems as improve the speed of data transfer between file servers and client devices.

A still further related object of the invention is to provide such methods and systems as reduce the gap between high RAID performance and the performance usable at the application level, e.g., when a network is disposed in between.

SUMMARY OF THE INVENTION

The foregoing are among the objects attained by the invention which provides, in one aspect, an improved system for data access comprising a file server that is coupled to a client device via one or more networks. The server comprises static storage that is organized in one or more directories, each containing, zero, one or more files. The server also comprises a file system operable, in cooperation with a file system on the client device, to provide authorized applications executing on the client device access to those directories and/or files. Fast file server (FFS) software or other functionality executing on or in connection with the server responds to requests received from the client device or an application executing thereon (collectively, "client") by transferring requested data to the client in parallel over multiple network pathways. That data can comprise, for example, directory trees, files (or portions thereof), and so forth.

Related aspects of the invention provide systems as described above in which the server stores a configuration file that is accessible by authorized clients (e.g., authorized applications executing on the client device) and that identifies one or more network interfaces over which the requested data can be transferred. Further related aspects of the invention provide systems as described above in which the configuration file additionally contains one or more security keys that can be used by the client and the server in connection with a requested data transfer.

Yet still further related aspects of the invention provide systems as described above in which the file system of the server controls access to the configuration file by the client. Such control can be based, for example, on access permissions associated with the configuration file and with the executing application.

Still further aspects of the invention provide systems as described above in which the client (e.g., an application executing on the client device) requests access to the configuration file and, if successful, generates a request for further data on the server. According to related aspects of the invention, the application generates such a request along with one or more of the security keys provided in the configuration file. In further related aspects of the invention, the application generates such a request on one or more network interfaces identified in that file. As noted above, the further data that is the subject of such a request can comprise, for example, directory trees, files (or portions thereof), and so forth.

Further aspects of the invention provide systems as described above in which the FFS functionality executing on (or in connection with) the server listens for requests on network interfaces identified in the configuration file. According to further related aspects of the invention, it listens only on those network interfaces that are connected to physically independent networks. Still further related aspects of the invention provide systems as described above in which the FFS functionality uses security keys provided with requests to validate those requests.

According to still further aspects of the invention, the FFS functionality responds to requests received from the client device by transferring requested data with the client via the multiple network connections over which those requests were received.

Further aspects of the invention provide systems as described above in which the server is coupled to multiple client devices via one or more networks. In such systems, the server responds to requests received from each client device by transferring requested data to that client device over multiple network pathways. According to related aspects of the invention, the configuration file specifies a different subset of network interfaces for each client (e.g., each client device and/or application executing thereon).

Still other aspects of the invention provide methods for transferring data between a server and one or more client devices paralleling the foregoing.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE INVENTION

Architecture

Figure 1:
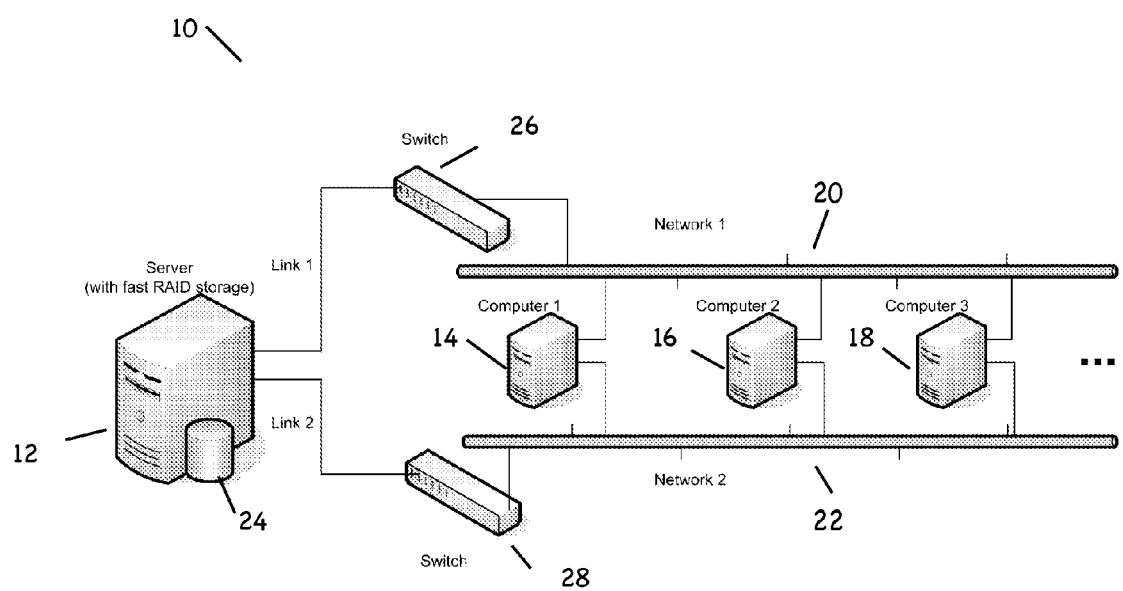
FIG. 1 depicts a digital data processing system according to the invention.
Figure 2:
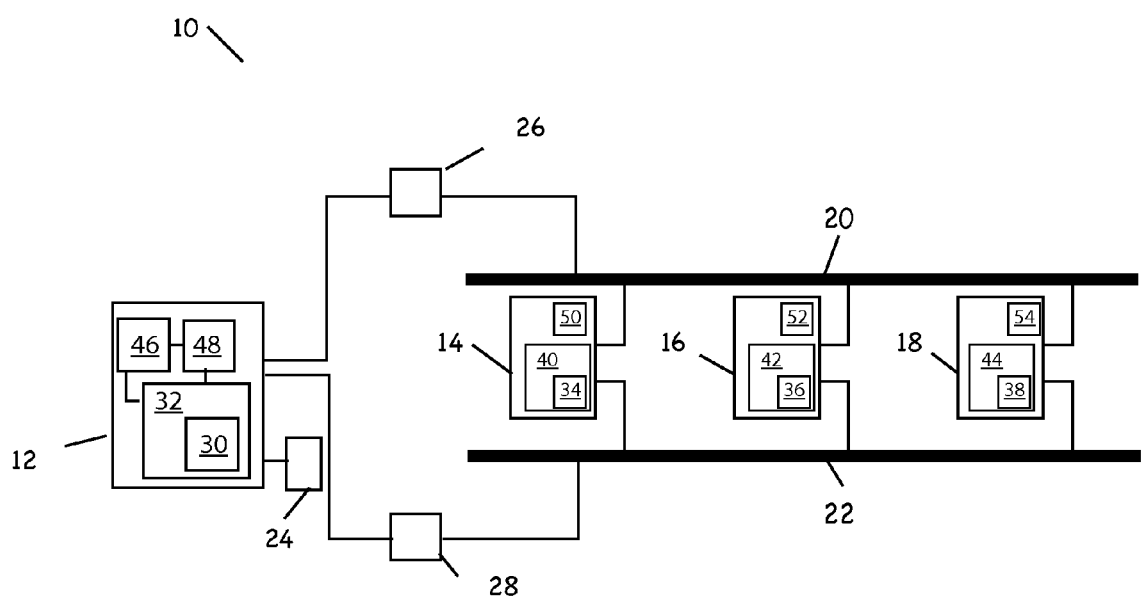
FIG. 2 is a further depiction of the digital data processing system of FIG. 1.

FIGS. 1 & 2 depict a digital data processing system 10 according to the invention. The system includes a file server 12 that is coupled to a client device 14 and, more typically, multiple client devices 14-18 via a network 20 and, more typically, multiple networks 20-22.

Server 12 may comprise a conventional file server and/or network attached storage (NAS) (collectively, "server" or "file server") of the type conventionally known in the art, as adapted in accord with the teachings hereof. Although only one server is shown in the drawing, it will be appreciated that the invention can be practiced with more such servers.

The server includes static storage that maintains user, application, enterprise or other data organized in the conventional manner known in the art—here, in one or more directories, each containing, zero, one or more files. In other embodiments, such data may be organized as serialized objects and/or in other manners known in the art. Storage device 24 typically comprises one or more disk drives (as shown) and, preferably, one or more high-speed RAID devices—though, in other embodiments, tape drives, ROM, RAM, Flash Memory, and/or CD-ROM devices may be used instead or in addition. Regardless, such storage device(s) 24 are of the type conventionally known in the art as adapted in accord with the teachings hereof.

The server 12 also comprises a file system 30 that forms part of and/or cooperates with a native operating system 32. Both of these components are of the type conventionally known in the art, as adapted in accord with the teachings hereof. Thus, for example, operating system 32 may comprise Linux or Microsoft Windows Server, both by way of non-limiting example and, file system 30 may comprise NTFS, EXT3, or XFS, again, by way of non-limiting example and by be exported by the operating system using a protocol such as SMB/CIFS or NFS, again, by way of non-limiting example. By way of said export protocols the file system 30 operates in cooperation with file systems 34-38 (discussed below) on the client devices 14-18 to provide authorized applications executing on the client device access to those directories and/or files.

Server 12 further comprises a fast file server (FFS) module 46—here, embodied in software executing on server 12, but in other instantiations embodied in hardware executing in conjunction with server 12—that responds to requests received from a client device 14-18 by transferring requested data (e.g., directory trees, files (or portions thereof), and so forth) with that client device over multiple networks 20-22.

Server 12 further comprises one or more configuration files 48 that store identities of one or more network interfaces over which the clients devices 14-18 may request data transfers. In preferred embodiments, the configuration file(s) 48 additionally store one or more security keys that can be used to validate and/or identify each requested data transfer. In the illustrated embodiment, the configuration files 38 are maintained in the conventional manner on storage unit 24, though, in other embodiments they may be stored elsewhere. The file(s) 48 may be text-based (e.g., XML), binary, or otherwise.

In the illustrated embodiment, file system 30 of the server 12 controls access to the configuration file(s) 48 in the conventional manner, e.g., using permissions (or other access controls) set so that only authorized users or applications (hereinafter, collectively, applications) executing on the client devices 14-18 can access the file(s) 48.

Networks 20-22 comprise local area networks (LANs), wide area networks (WANs), metropolitan area networks (MANs), or other networks of the type commonly known in the art supporting communications between client and server devices (and including conventional infrastructure, such as switches 26-28). These may be based in the Internet Protocol (IP) or other protocols, and they may include wireless, wired, satellite and/or other communication mechanisms of the type known in the art. The networks 20-22 may of the same variety (e.g., both megabit Ethernet, by way of non-limiting example) or of mixed varieties (e.g., megabit Ethernet and conventional Ethernet, again, by way of non-limiting example). Though two such networks are shown in the illustration, the invention contemplates a greater or lesser number thereof.

Client devices 14-18 comprise personal computers, workstations, embedded processors, single-board computers, personal digital assistants or other digital data processing device conventional in the art capable of cooperating in a client-server network and of executing software (here, referred to as "applications" or "software applications") requiring access to storage unit 24. In the illustrated embodiment, those devices are remotely disposed from the server 12 and coupled for communications with it via network media 20-22 operating in accord with the TCP/IP protocol. In other embodiments, one or more of the client devices 14-18 are coupled with the sever 12 via a combination of network media (e.g., Ethernet and so forth) as well as via direct wired or wireless media (e.g., USB interconnect, firewire interconnect, Bluetooth, infrared, and so forth). Those applications, labeled 50-54, respectively, executing on the respective client devices may comprise signal processing applications, visualization applications, and so forth. The client devices 14-18 may be of the same and/or mixed varieties. And, though shown in the drawing coupled to server 12 via a common set of networks 20-22, may be so coupled on sets of disparate (and/or, possibly overlapping) networks.

Like server 12, client devices 14-16 comprise respective file systems 34-38 that form part of and/or cooperate with respective native operating system 40-44. These, too, are of the type conventionally known in the art, as adapted in accord with the teachings hereof. Thus, for example, operating systems 40-44 may comprise Linux or Microsoft Windows XP, both by way of non-limiting example; and, file systems 34-38 may comprise SMB/CIFS or NFS clients, again, by way of non-limiting example.

Operation

Figure 3:
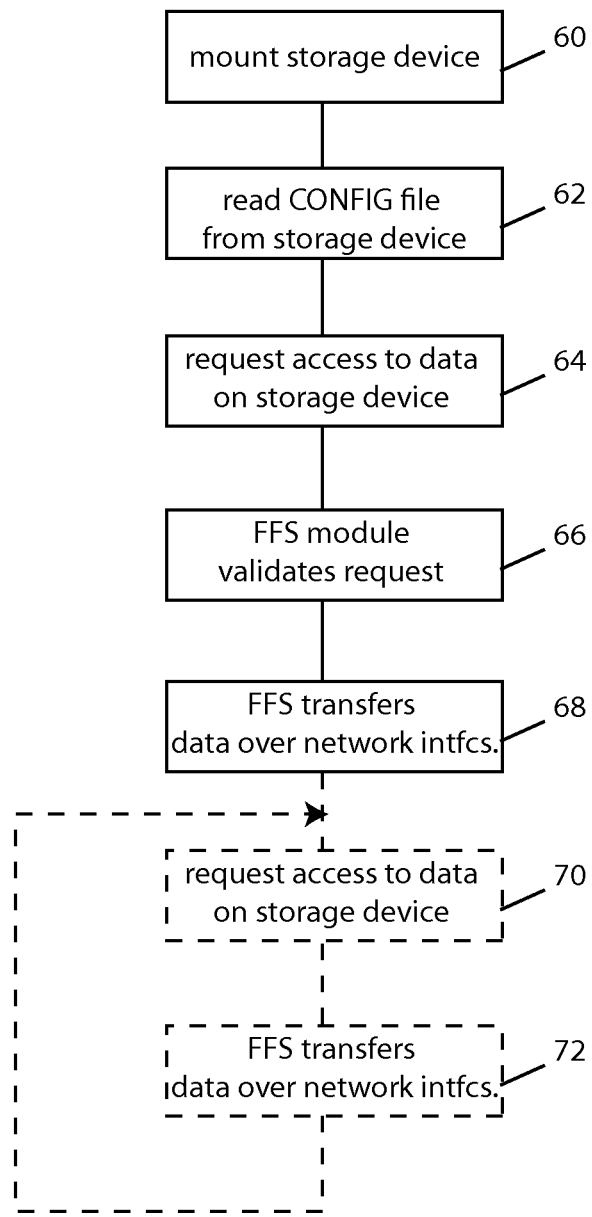
FIG. 3 depicts a method of operation of the system of FIG. 1.

FIG. 3 depicts operation of the system 10 in connection with a client request for access to storage 24. Although the discussion focuses on requests by application 50 of device 14, it will be appreciated that requests by other applications and/or devices (collectively, "clients") proceed similarly.

In step 60, client device 14 mounts storage device 24 (or a volume therein) as a "share" (in Windows terminology) or otherwise. This can be effected by a user of device 14, application 50 executing thereon and/or by the operating system 40 (e.g., as part of a start-up routine), though for purposes of the discussion that follows, mounting will be assumed to be effected by the application 50. Mounting proceeds in the conventional manner, as mediated by the operating system 40, file system 34 of the client device, and file system 30 of the server. Per convention, any and/or all of these may prohibit mounting unless the requesting user and/or application 50 has appropriate security permissions.

Assuming mounting is successful, client application 50 requests access to configuration file 48 on storage device 24. See step 62. In the illustrated embodiment, this is for READ access to the file 48, though, other embodiments may provide for WRITE, LOCK, or other access to that file 48. Regardless, processing of the request for (read) access proceeds in the conventional manner, as mediated by the operating system 40, file system 34 of the client device 14, and file system 30 of the server. As above and per convention, any and/or all of these may prohibit access unless the requesting user and/or client application 50 has appropriate security permissions.

Assuming access to file 48 is granted, the client application 50 obtains from that file 48 identifications of network interfaces (e.g., ports) and security keys. The client application 50 then generates a request for access to data (e.g., a directory tree, file or portion thereof) using those IDs and keys. See step 64. In the discussion that follows, this is assumed to be a request for READ access, although, requests for OPEN, CLOSE, SEEK, WRITE, DELETE FILE, RENAME FILE, MOVE FILE, and so forth, access are similarly handled. The commands are issued in the conventional ordering (e.g., READ, WRITE OR CLOSE following OPEN) and can specify a previously opened file or a file name.

Although, in some embodiments, the access request of step 62 can be made via the respective file systems 40, 34, in the illustrated embodiment, that request is made directly by client application 50 to the FFS module 46 of the server 12. To this end, the protocol for communications between the client application 50 and FFS module 46 can be simpler and/or more specialized than traditional file system access requests, thereby facilitating higher performance than standard network file systems. Moreover, that protocol can be implemented on top of physical or logical network layers which are not supported in a straight forward way by standard network file systems. An example is DAPL on Infiniband networks.

The request specifies the data structure (e.g., directory tree, file, etc.) to be accessed, as well as the security keys (identified in the configuration file 48) for identifying and validating the request. In the illustrated embodiment, the request is transferred, in parallel, over each network interface (identified in the configuration file 48) over which the client application 50 specifies access to occur, though, in other embodiments, the request may be transmitted by remote procedure call (RPC), COM, DCOM, CORBA or otherwise, and may include identifiers for each such network interface.

In step 66, the FFS module 46—which, in the illustrated embodiment, listens for requests on network interfaces identified in the configuration file 48—validates the request received in step 64. This includes verifying that the security keys provided in the request are valid, that the application 50 has permission (per the file system 34) for access to the requested data (e.g., directory tree and/or file) and that network interfaces specified for the request are available for the transfer. In some embodiments, the FFS module 46 listens for and/or validates requests only for transfers on physically independent networks. In some embodiments, the FFS module 46 can implement validation independently of the file system 32. In other embodiments, it utilizes the operating system 32 and file system 30 for at least some of these purposes.

Assuming the FFS module 46 validates the request, the module 46 mediates the data transfer as between the storage device 24 (via the server's file system 32) and the client application 50 (via the specified interfaces to networks 20-22). For example, in the case of a READ operation, the FFS module obtains the requested data (e.g., file blocks or directory tree) and transmits it to the application 50 concurrently over the multiple network pathways specified by those interfaces. See step 68. Thus, typically, for example, the FFS module transmits the requested data to the client application 50 over two or more separate networks 20, 22; however, it may (depending on the specified interfaces) send the data over two separate channels on the same network (e.g., as where per-channel bandwidth is rate-limited). In the case of WRITE or other operations, the FFS exchanges the requisite information with the client application 50 over those interfaces and duly writes it to the storage device 24.

Once the FFS module 46 has validated access to a given file, directory tree and so forth, the application 50 may continue making requests (e.g., successive read or write requests) without further validation. This is reflected in steps 70-72.

Although the discussion focuses on responses by FFS module 46 to requests from client application 50 executing on device 14, the module 46 responds similarly to other applications on that device 14, as well as to other applications on other devices 16-18. Thus, the FFS module 46 of the illustrated embodiment responds to requests received from each such client by transferring requested data to that client over multiple network interfaces—and, therefore, network pathways—specified in the request. These may be common sets of pathways, partially overlapping sets of pathways, or entirely disparate sets of pathways.

Example

An example of an implementation of system 10 for medical visualization is as follows. In the implementation described here, the client devices 14-18 are presumed to be visualization servers, which process large medical image studies stored on the file server 12. Upon selection of a study by a user, the data has to be loaded as fast as possible to minimize waiting time.

FFS module 46 is implemented as a process (e.g. a Windows™ service) running on file server 12, subsequently referred to as "Service." Upon startup, the Service writes a file (configuration file 48) into each directory tree to be "exported," i.e., available for access by a client device 14-18. Those directory trees are exported as standard Microsoft Windows Shares. The configuration file 48 has read permissions which are as restrictive as the most restrictive read permissions of any of the files in that directory tree. The configuration file 48 contains an access key randomly generated by the Service, as well as IP addresses of the network interfaces of the file server and the TCP/IP port on which the Service listens for incoming connections.

Each client device 14-18 which has access to the Windows Share and has permission to read the configuration file 48 can use the FFS module 46 for fast file transfer. It connects to the network interfaces and port specified in the configuration file 48. It transmits the contents of the access key (thereby proving that it had read permission to the configuration file 48). On the connection linked to each of the network interfaces the same session key is transmitted, thereby associating these links with one logical connection.

A data read command is satisfied by the Service using multiple simultaneous threads and double buffering. One thread reads the data from the disk 24 or RAID device. One thread per network interface transmits the data. Thereby effectively parallelizing disk read and concurrent data transmission on all network interfaces.

CONCLUSION

Described above are systems and methods meeting the aforesaid objects, among others. It will be appreciated that the embodiments shown and described herein are merely examples of the invention and that other embodiments incorporating changes therein fall within the scope of the invention. Thus, by way of non-limiting example, it will be appreciated that the invention can be practiced with peer-to-peer networks, grid networks and so forth, wherein the role of "server" is played by a set of one or more devices in such networks and the role of "client" is played by a set (possibly overlapping) of one or more (other) devices in the network.

What is claimed is:

1. A system to allow transfer of requested data comprising:
   a file server capable of receiving communications from a client executing application;
   a file system of the file server;
   a plurality of networks;
   a software program stored on the file server which generates a configuration file which specifies from the plurality of networks, one or more network interfaces over which data can be transmitted to the client executing application, where the file system controls access to the configuration file by the client executing application, where access is granted based in part on the identity of the client executing application, where when the file server receives a request from the client executing application for data the file server responds by transferring the data over the one or more network interfaces specified by the configuration file.

2. The system of claim 1, where the data comprises any of directory trees, files, or portions thereof.

3. The system of claim 1, where the file server controls access to the configuration file.

4. The system of claim 1, where the file server controls access to the configuration file by way of access permissions associated with the configuration file.

5. The system of claim 1, where the one or more network interfaces specified by the configuration file are physically independent networks.

6. The system of claim 1, where one or more security keys are used to identify a requested data transfer.

7. The system of claim 1, where receipt of the configuration file is based on access permissions associated with the configuration file.

8. A method to enable delivery of data comprising the steps of:
   receiving a software program on a file system of a file server in communication with a client executing application on a client device;
   responding to a request for data by transferring a configuration file generated by the software program to the client executing application on the client device, where the configuration file identifies one or more network interfaces from a plurality of network interfaces over which data can be transferred between the file server and the client executing application on the client device, where the file system controls access to the configuration file by the client executing application, where access is granted based in part on the identity of the client executing application; and
   responding to a request for data by transferring the requested data to the client executing application on the client device over the one or more network interfaces.

9. The method of claim 8, where the data comprises any of directory trees, files, or portions thereof.

10. The method of claim 8, where the file server controls access to the configuration file.

11. The method of claim 8, where the file server controls access to the configuration file by way of access permissions associated with the configuration file.

12. The method of claim 8, where the one or more network interfaces specified by the configuration file are physically independent networks.

13. The method of claim 8, where one or more security keys are used to identify a requested data transfer.

14. The method of claim 8, where the file server delivers a first set of data requested by a first client device to the first client device and a second set of data requested by a second client device to the second client device.

15. A method to send data comprising the steps of:
    executing a software application on a file system of a server to generate a configuration file residing on the server;
    monitoring for requests from a client executing application on a client device;
    receiving a request for access to the configuration file from the client executing application on the client device;
    granting access to the configuration file to the client executing application, where the file system controls access to the configuration file based in part on the client executing application, where access is granted based in part on the identity of the client executing application;
    monitoring on one or more network interfaces identified in the configuration file for requests for data from the client executing application; and
    sending the data to the client executing application on the client device over the one or more network interfaces in response to the request.

16. The method of claim 15, where the data comprises any of directory trees, files, or portions thereof.

17. The method of claim 15, where the server verifies access authority to the configuration file by way of access permissions associated with the configuration file.

18. The method of claim 15, where the one or more network interfaces specified by the configuration file are physically independent network interfaces.

19. The method of claim 15, where one or more security keys are present in the configuration file, where the one or more security keys are used to verify access authority for a requested data transfer.

20. The method of claim 15, where the server transfers a first set of data requested by a first client device to the first client device and a second set of data requested by a second client device to the second client device.

* * * * *